United States Patent
Jung

(10) Patent No.: US 7,787,866 B2
(45) Date of Patent: Aug. 31, 2010

(54) APPARATUS AND METHOD FOR MANAGING MESSAGES IN MOBILE COMMUNICATION TERMINAL

(75) Inventor: Dong-Wook Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 599 days.

(21) Appl. No.: 11/803,284

(22) Filed: May 14, 2007

(65) Prior Publication Data
US 2007/0287432 A1    Dec. 13, 2007

(30) Foreign Application Priority Data
Jun. 12, 2006    (KR) ...................... 10-2006-0052305

(51) Int. Cl.
*H04L 12/58*    (2006.01)
(52) U.S. Cl. .................... 455/412.1; 455/466
(58) Field of Classification Search ........................ None
See application file for complete search history.

(56) References Cited
U.S. PATENT DOCUMENTS

| | | |
|---|---|---|
| 5,835,084 A | 11/1998 | Bailey et al. |
| 6,343,219 B1 | 1/2002 | Wada |
| 2006/0053048 A1 | 3/2006 | Tandetnik |

FOREIGN PATENT DOCUMENTS

| | | |
|---|---|---|
| CN | 1236270 | 11/1999 |
| EP | 1 262 893 | 12/2002 |
| JP | 2000-209329 | 7/2000 |
| JP | 2005-110293 | 4/2005 |
| KR | 1020030087880 | 11/2003 |
| KR | 1020050055533 | 6/2005 |
| KR | 1020050120853 | 12/2005 |

*Primary Examiner*—Erika A Gary
(74) *Attorney, Agent, or Firm*—The Farrell Law Firm, LLP

(57) ABSTRACT

Provided are an apparatus and method for managing messages in a mobile communication terminal. The method includes the steps of displaying a message list including check boxes to check whether to delete each listed message in a select/delete mode, displaying detailed contents of a highlighted message from the message list in a pop-up window when the highlight moves, checking a highlighted message when a selection key input is made while the pop-up window is displayed, and deleting checked messages from the message list when a delete key input is made. Because detailed contents of messages in a list for deletion can be checked in the select/delete mode according to the present invention, not only can the problem of mistakenly deleting messages be obviated, user convenience is also improved.

17 Claims, 5 Drawing Sheets

APPARATUS AND METHOD FOR MANAGING MESSAGES IN MOBILE COMMUNICATION TERMINAL

PRIORITY

This application claims priority under 35 U.S.C. §119 to an application filed in the Korean Intellectual Property Office on Jun. 12, 2006 and allocated Serial No. 2006-52305, the contents of which are incorporated herein by reference.

BACKGROUND OF THE INVENTION

1. Field of the Invention

The present invention relates generally to an apparatus and method for managing messages in a mobile communication terminal, and more particularly, to an apparatus and method for selectively deleting messages.

2. Description of the Related Art

The use of mobile communication terminals is rapidly increasing due to developments in various electronics and communications industries. Consequently, service providers (and terminal manufacturers) are competitively developing mobile communication terminals with various functions to attract potential users. For example, mobile communication terminals now have phone directories, games, schedulers, message, Internet, e-mail, and various other functions.

As mobile communication terminals become more diversified in their capabilities, the trend for providing multimedia messaging service, in which image files can be attached and send with messages, is becoming more popular. Thus, in the below description, messaging refers to not only simple text messages that can be transmitted and received, but also to multimedia messages.

Data provided recently through messaging services includes useful information, but also includes in the upper portion of the message advertising content that a user does not need or want. The unnecessary data consumes a lot of memory space. Most users tend to delete unneeded messages when the memory becomes full. A user can delete messages one at a time or delete all the messages at once. On the one hand, deleting messages by checking and deleting them one at a time consumes a lot of time. Conversely, by automatically deleting all the messages at once, the user may regret having deleted important messages that should have been retained. Modern mobile terminals have large storage capacities capable of storing hundreds of messages, so that deleting the messages one by one is very inefficient.

Therefore, terminals that allow selective deleting of messages have been introduced. This select and delete function displays a message list that includes check boxes in each message for checking that a message should be deleted, enabling a user to check messages to be deleted using the check boxes and delete a plurality of messages at once by pressing a deletion key. However, because only a small portion of the respective contents of the messages appear in a message list (which may include a part of the message, a phone number, or a sender's name), it is difficult for a user to determine just from the displayed information which, of the listed messages should be deleted.

Thus, because messages are deleted without their contents being checked, there is the danger of deleting messages that were not intended for deletion. Also, if a user wishes to check the contents of messages before deleting the messages, the user must first cancel the select and delete function, check each message individually to determine if it's to be deleted, and re-enable the select and delete function. Therefore, the select and delete function suffers similar problems as the process of checking and deleting each message individually, in that it becomes redundant.

Messages not only consist of text messages, but also include still images, moving images, music messages, and other formats. In the case of multimedia messages such as still images, moving images, and music messages, the inability of a user to determine the contents of a message from the very limited data displayed in the above-described message list inconveniences the user even further.

SUMMARY OF THE INVENTION

An object of the present invention is to substantially solve at least the above problems and/or disadvantages and to provide at least the advantages below. Accordingly, an object of the present invention is to provide an apparatus and method for selecting and simultaneously deleting messages in a mobile communication terminal.

Another object of the present invention is to provide an apparatus and method that allow for message contents to be checked while performing a select and delete function in a mobile communication terminal.

According to a first aspect of the present invention, there is provided a method of managing messages in a mobile communication terminal, including displaying a message list for selecting messages to delete in a select/delete mode; and displaying detailed contents of a message that is highlighted from the message list in a pop-up window when the highlight is detected to have moved.

According to a second aspect of the present invention, there is provided a method of managing messages in a mobile communication terminal, including displaying a message list including check boxes for checking whether to delete each message in the message list in a select/delete mode; displaying detailed contents of a message that is highlighted in the message list in a pop-up window when the highlight is detected to have moved; checking a message that is highlighted when a selection key input is made while the pop-up window is displayed; and deleting identified messages (checked check boxes) from the message list when the delete key is pressed.

According to a third aspect of the present invention, there is provided an apparatus for managing messages in a mobile communication terminal, including a controller for generating a pop-up window for displaying detailed contents of a highlighted message while the message list is displayed in a select/delete mode, and generating and outputting data to be displayed in the pop-up window on the message list; and displaying s the data from the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Described hereinafter is a method for selecting and simultaneously deleting messages in a mobile communication terminal. The present invention especially describes how message contents are checked during the selection and deletion mode. The messaging services described below include short message service (SMS), multimedia messaging service (MMS), enhanced messaging service (EMS), e-mails, etc.

Figure 1:
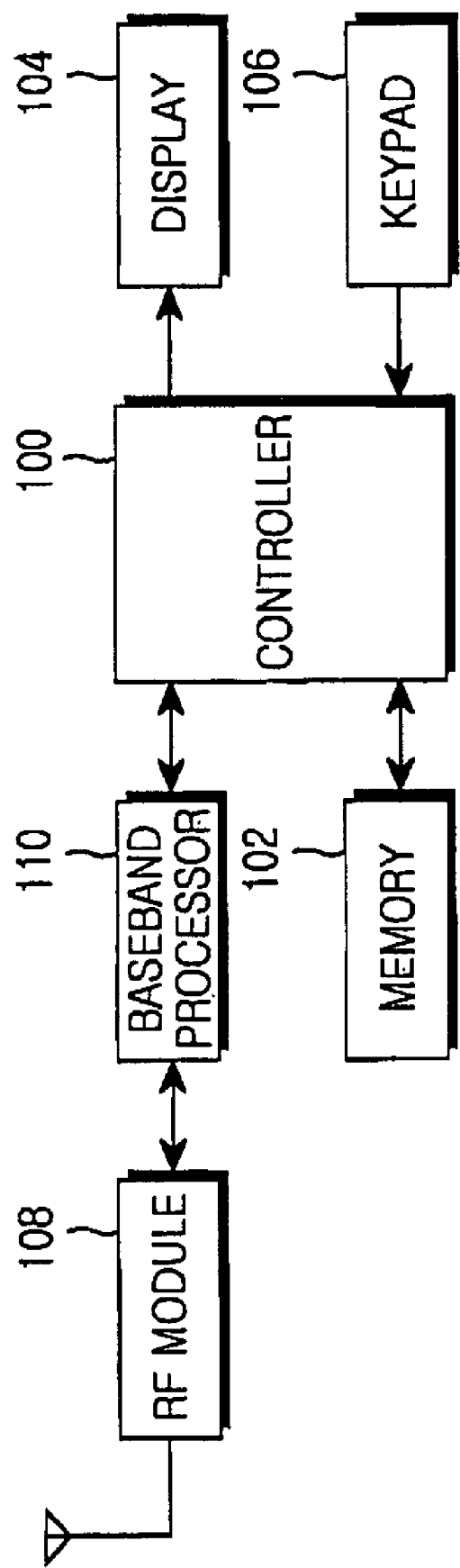
FIG. 1 is a block diagram of a typical mobile communication terminal according to the present invention.

Referring to FIG. 1, the mobile communication terminal may be a second or third generation (2G or 3G) Code Division Multiple Access (CDMA) terminal, a fourth generation (4G) Broadband Wireless Access (BWA) terminal, or any mobile communication terminal capable of transmitting and receiving messages. The descriptions given below refer generally to these aforementioned mobile communication terminals.

Referring to FIG. 1, a controller 100 controls the overall operations of the mobile communication terminal. For instance, it performs processing and controlling of audio communication and data communication. It also has an added capability of allowing the user to check messages while the messages are being selected and deleted, according to the present invention. Controller 100 displays a separate pop-up window with the contents of a highlighted item (message), while a message list is being displayed. Here, the separate window may be a transparent window or a balloon-type window that is projected onto a background screen (a message list). This type of pop-up function will be described in detail below with reference to FIG. 2.

Memory 102 may include program memory, data memory, and non-volatile memory. Memory 102 stores programs for controlling the overall operation of the mobile communication terminal, temporary data that arises during the operation of the terminal, and system parameter and other relevant data (i.e., phone numbers, messages, etc.).

Display unit 104 displays operating information (or indicators) during the operation of the mobile communication terminal, numerals and characters that have been entered, various moving and still images, etc. Display unit 104 may use a liquid crystal display (LCD), which may be a touch screen type that functions doubly as an input device.

Keypad 106 includes number keys and a plurality of function keys (a send key, navigational (or arrow) keys, an OK key, etc.) and letter keys (for text messaging, etc., that share the other buttons). When a user presses a key, its corresponding key data signal is sent to controller 100.

Radio Frequency (RF) module 108 processes an RF signal received through an antenna. Baseband processor 110 processes a baseband signal transmitted and received between RF module 108 and Controller 100.

Figure 2:
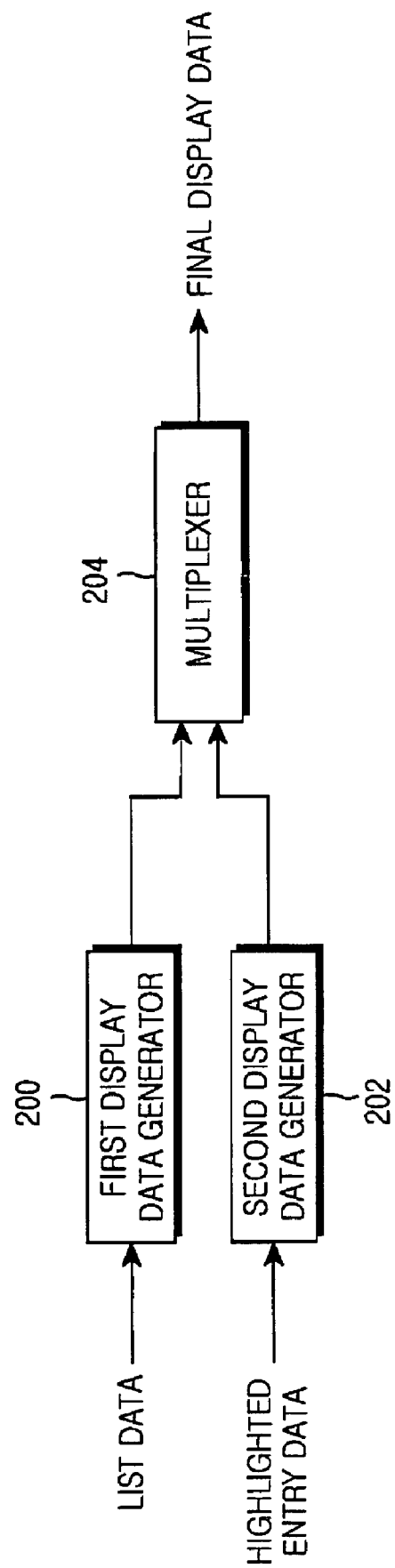
FIG. 2 is a block diagram detailing the function of a controller in a mobile communication terminal according to the present invention.

Referring to FIG. 2, this block diagram shows the function that allows message contents from a highlighted portion of a message list to pop up during a select/delete mode according to the present invention, controller 100 includes a first display data generator 200, a second display data generator 202, and a multiplexer 204.

Referring to FIG. 2, when the select and delete mode is selected, first display data generator 200 receives input message list data, generates and outputs a first display data on the message list screen. When the highlighted portion in the message list is altered, second display data generator 202 receives input data of the highlighted entry, generates and outputs a second display data of the highlighted entry in a pop-up window.

Here, the pop-up window may be a transparent window or a bubble window. Factors such as what type of pop-up window to use, the color and transparency of the pop-up window, the color of text in the pop-up window, etc. may be selected by the user. That is, second display data generator 202 generates the second display data based on the user's settings.

Multiplexer 204 multiplexes and outputs the first display data from first display data generator 200 and the second display data from second display generator 202. In other words, multiplexer 204 overlaps and outputs the first and the second display data. Here, the method of overlapping two images may be the On Screen Display (OSD) function used when a camera takes a picture. Since this function is well known to those skilled in the art, a description thereof will not be given. A final display data output from multiplexer 204 is provided to display 104. Below, a description will be given of a transparent pop-up window that is used for displaying the contents of messages.

The operation of the apparatus shown in FIGS. 1 and 2 will now be described in detail.

Figure 3:
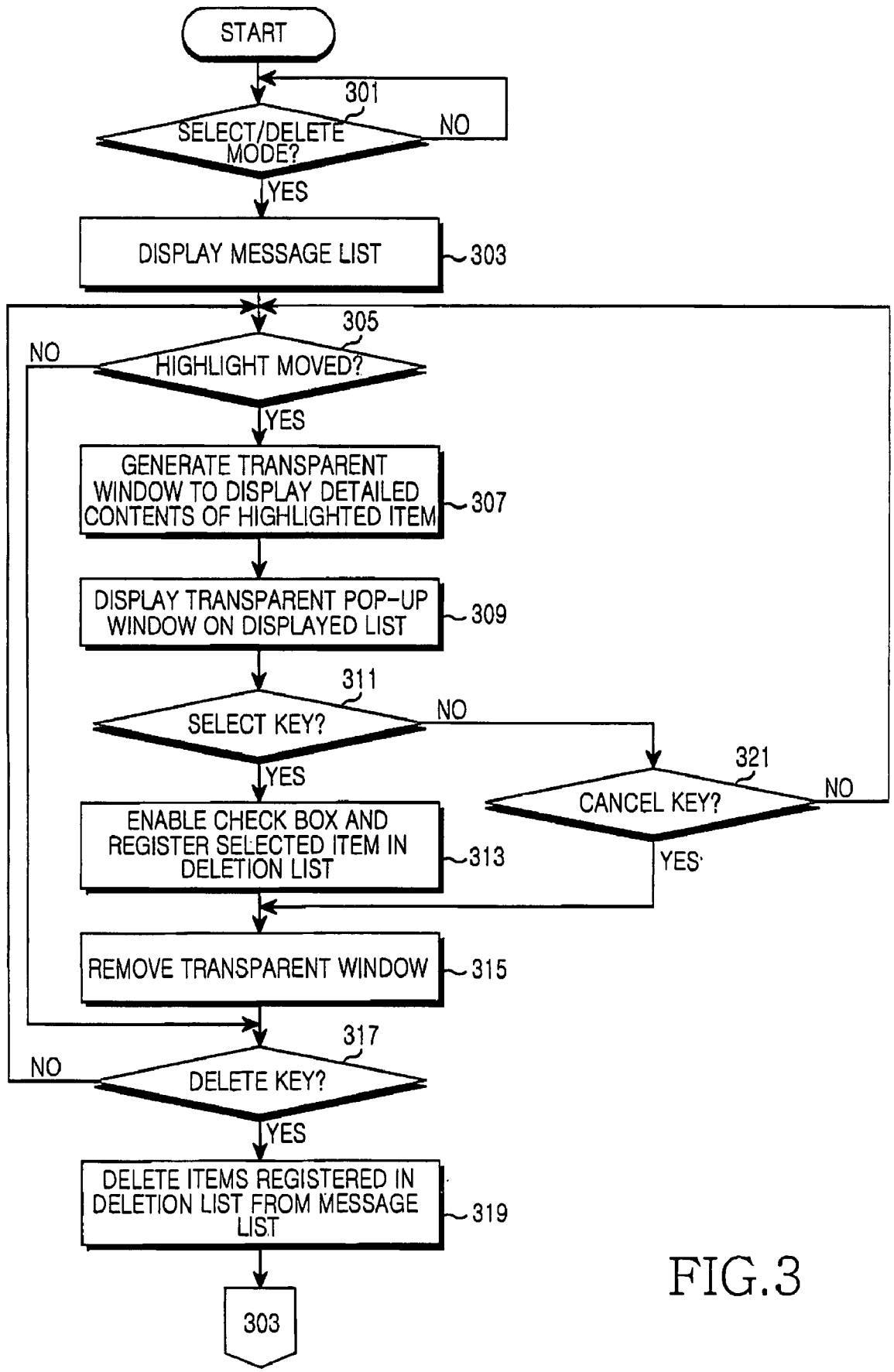
FIG. 3 is a flowchart of a process for performing a message selecting and deleting function in a mobile communication terminal according to the present invention.

Referring to FIG. 3, controller 100 first performs step 301 in which it determines if a user has selected the message select/delete mode using key inputs. If the select/delete mode has been selected, controller 100 displays a message list on the display in step 303. Here, each row (line) of the message list displays a check box for selecting whether to delete the corresponding message and a short excerpt of the message (a portion of the message contents, a phone number, or the sender's name, etc.). Here, a highlighting element (a selecting icon or a shaded background) is positioned on the first row (or line), and a transparent window showing the highlighted item's contents in detail may be made to pop up.

After the message list is displayed, controller 100 performs step 305 in which it detects if the user moves the highlight. Here, when it is detected that the highlight has not been moved, controller 100 performs step 317. If it is detected that the highlight has been moved, controller 100 performs step 307 in which it generates a transparent window showing the detailed contents of the newly highlighted item. Here, the user may adjust the border, transparency, text color, etc.

Figure 4A:
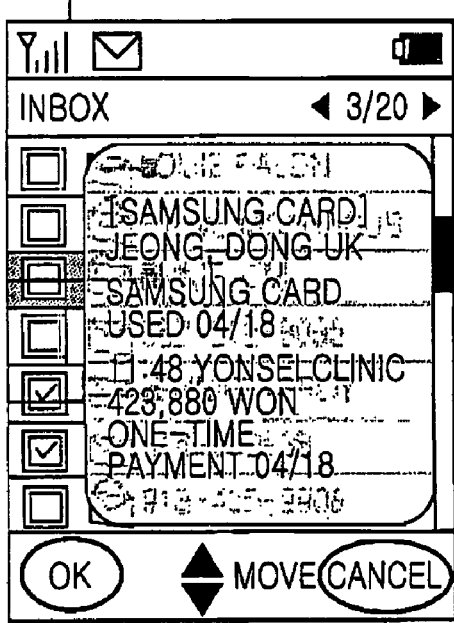
FIGS. 4A to 4C and FIG. 5 are examples of displayed screens according to the present invention.

After the transparent window is generated, controller 100 performs step 309 in which it displays the transparent pop-up window on the screen displaying the message list. For example, a transparent window is overlapped onto a message list, as shown in FIG. 4A.

Figure 4B:
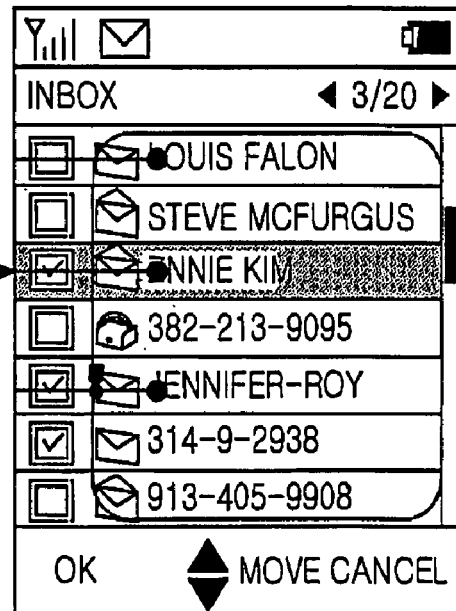
Figure 4C:
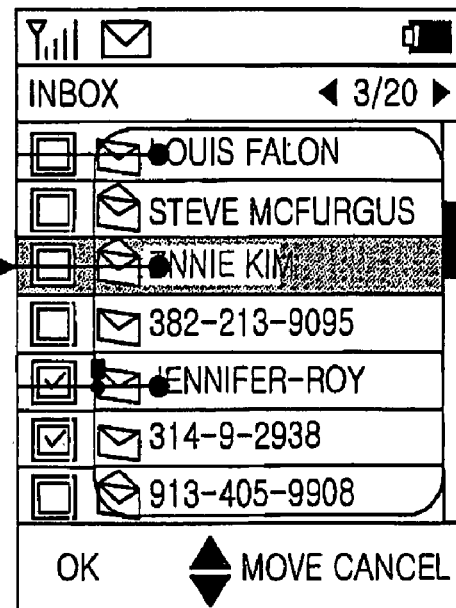

After the transparent window is displayed as a pop-up, controller 100 detects if a key input has been made for selecting the currently highlighted item in step 311. When a select key input is not detected, controller 100 detects in step 321 if a cancel key for removing the highlighted item has been pressed. If the cancel key is not detected, controller 100 returns to step 305 to perform the preceding steps again. If the cancel key input is detected, controller 100 removes the transparent window from the screen in step 315. When the cancel key input is detected, as shown in FIG. 4A, the screen in FIG. 4C is displayed.

If a select key input is detected, controller 100 enables the check box of the currently highlighted item and registers that item (message) on the list for deletion in step 313. Then, controller 100 removes the transparent window from the display in step 315. For example, when an OK command is issued in the screen shown in FIG. 4A, a screen such as that in FIG. 4B is displayed.

After the transparent window is removed, controller 100 determines if a delete key input for deleting the messages selected for deletion is detected in step 317. Here, if an input of the delete key is not detected, controller 100 returns to step 305 to perform the preceding steps again. If an input of the delete key is detected, controller 100 performs step 319, where the list of messages (in the message storage) that have been selected for deletion is deleted, whereupon step 303 is revisited.

Although in the above embodiment detailed content of highlighted items is automatically made to pop up, in alternate embodiments, messages may be made to pop up only when a separate key input is made after the highlighted item is changed. Furthermore, message deletion is performed when the transparent window is removed, in alternate embodiments, messages may be deleted while a pop-up transparent window remains on the display.

Below, a detailed description of certain applications will be provided for a more thorough understanding of the present invention.

FIG. 4A shows a display using a transparent window with detailed contents of a highlighted item while a message list is displayed in a select/delete mode. Here, a user checks the detailed contents of the highlighted message and enters the OK key if (s)he wishes to delete the message. When the select key input is detected, a check box such as that in FIG. 4B is checked, and the transparent window is removed. If the user does not wish to delete the message that is highlighted when the transparent pop-up window is displayed, the user inputs the cancel key. When the cancel key input is detected, only the transparent window is removed from the display, as shown in FIG. 4C. When the delete key input is detected in the displays shown in FIGS. 4B and 4C, the checked messages are deleted.

Thus, a user uses the navigation keys to check the detailed contents of messages to determine whether to delete the messages. Because the checking and deleting of messages is possible while a message list is displayed in select/delete mode according to the present invention, managing messages is that much easier.

The transparent window may not only display the above-described messages, but also still images, moving images, audio messages, and other types of messages.

Figure 5:
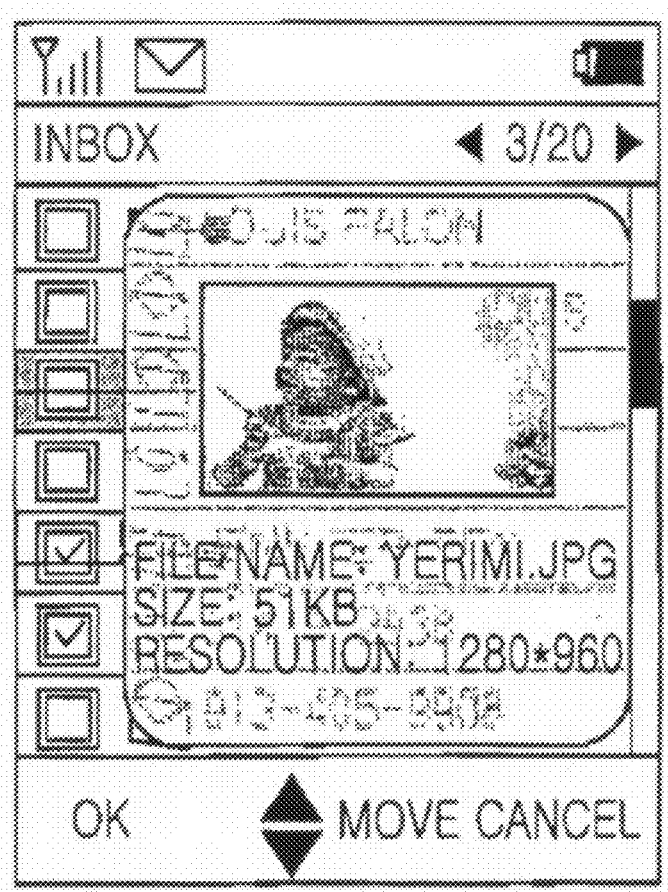

FIG. 5 shows a screen displaying a still image using a transparent window. As shown in FIG. 5, when a still image is displayed, the transparent window displays the image in a thumbnail size along with general data on the image (e.g., title, size, resolution, etc. of the file).

In the case of moving images, a transparent window may be used to display detailed content of a message with a moving image. When a message with a moving image is highlighted in a message list displayed in the select/delete mode, the moving image is played back and displayed in a transparent window. Here, the entire moving image may be played back, or a single frame (key frame) may be decoded and played back. Here, the general data of the moving image message is also displayed.

In the case of audio messages, detailed contents of the audio message may be displayed on a transparent window. When the audio message is highlighted while the message list is displayed in the select/delete mode, the highlighted audio message is played back and simple audio playback window is displayed on a transparent window. Here, general data on the audio message is also displayed.

Because detailed contents of messages in a list for deletion can be checked in the select/delete mode according to the present invention, not only can the problem of mistakenly deleting messages be obviated, user convenience is also improved. Also, because the checking of messages according to the present invention applies to multimedia messages as well as text messages, a user is provided with a more convenient tool for managing messages.

While the invention has been shown and described with reference to certain preferred embodiments thereof, it will be understood by those skilled in the art that various changes in form and details may be made therein without departing from the spirit and scope of the invention as further defined by the appended claims. For instance, the pop-up function of detailed content according to the present invention may be applied to all types of list search (or navigation) modes—for example, it may be applied to communication history search modes, search modes for searching messages in message storages (out and in boxes), etc. Therefore, the scope of the present invention should not be limited to the above-described embodiments or the claims appended below, but should encompass all embodiments recited by the claims.

What is claimed is:

1. A method of managing messages in a mobile communication terminal, comprising the steps of:
   displaying a message list for selecting messages to delete in a select/delete mode; and
   displaying detailed contents of a message that is highlighted from the message list in a pop-up window when the highlight is detected to have moved,
   wherein each line of the displayed message list includes brief information on a corresponding message and a check box for checking whether to delete the corresponding message.

2. The method of claim 1, wherein the pop-up window is one of a transparent window and a bubble window.

3. The message of claim 1, wherein the detailed contents displayed in the pop-up window are at least one of a playback window for a text message, still image message, moving image message, and audio message.

4. The method of claim 1, further comprising registering the message identified by the highlight in a deletion list when a select key input is detected during the displaying of the pop-up window.

5. The method of claim 4, further comprising deleting messages registered in the deletion list from memory when a delete key input is detected.

6. A method of managing messages in a mobile communication terminal, comprising the steps of:
   displaying a message list including check boxes provided for checking whether to delete each message in the message list in a select/delete mode;
   displaying detailed contents of a message that is highlighted from the message list in a pop-up window when the highlight is detected to have moved;
   checking a highlighted message when a select key input is made while the pop-up window is displayed; and
   deleting checked messages from the message list when a delete key input is made.

7. The method of claim 6, wherein the pop-up window is one of a transparent window and a bubble window.

8. The method of claim 6, wherein the detailed contents displayed in the pop-up window are at least one of a playback window for a text message, moving image message, still image message, and audio message.

9. An apparatus for managing messages in a mobile communication terminal, comprising:

a controller for generating a pop-up window for displaying detailed contents of a highlighted message after detecting a movement of the highlight while a message list is displayed in a select/delete mode, generating and displaying data in the pop-up window on the message list; and a display for displaying the data from the controller, wherein each line of the displayed message list includes brief information on a corresponding message and a check box for checking whether to delete the corresponding message.

10. The apparatus of claim 9, wherein the pop-up window is one of a transparent window and a bubble window.

11. The apparatus of claim 9, wherein the detailed contents displayed in the pop-up window are at least one of a playback window for text message, still image message, moving image message, and audio message.

12. The apparatus of claim 9, wherein the controller registers the message identified by the highlight in a deletion list when a select key input is detected during the displaying of the pop-up window.

13. The apparatus of claim 12, wherein the controller deletes messages registered in the deletion list from memory when a delete key input is made.

14. The apparatus of claim 12, wherein the controller comprises:

a first display data generator that generates at least a first display data for displaying the message list on a display in the select/delete mode;

a second display data generator that generates at least a second display data for displaying detailed contents of the message indicated by the highlight in the pop-up window when movement of the highlight is detected while the message list is displayed; and a multiplexer for overlapping the first display data and the second display data, and generating a final display data.

15. A method of managing messages in a mobile communication terminal, comprising the steps of:

displaying a message list including at least one message; and displaying detailed contents of a message selected form the message list in a pop-up window, wherein the displayed message list includes brief information on a corresponding message and a check box for checking whether to delete the corresponding message.

16. The method of claim 15, wherein the pop-up window is one of a transparent window and a bubble window.

17. A mobile communication terminal for managing messages, comprising:

means for outputting a message list including at least one message and for outputting detailed contents of a message selected form the message list; and means for displaying the message list, and the detailed contents of a message selected form the message list in a pop-up window, wherein the displayed message list includes brief information on a corresponding message and a check box for checking whether to delete the corresponding message.

* * * * *